UNITED STATES PATENT OFFICE.

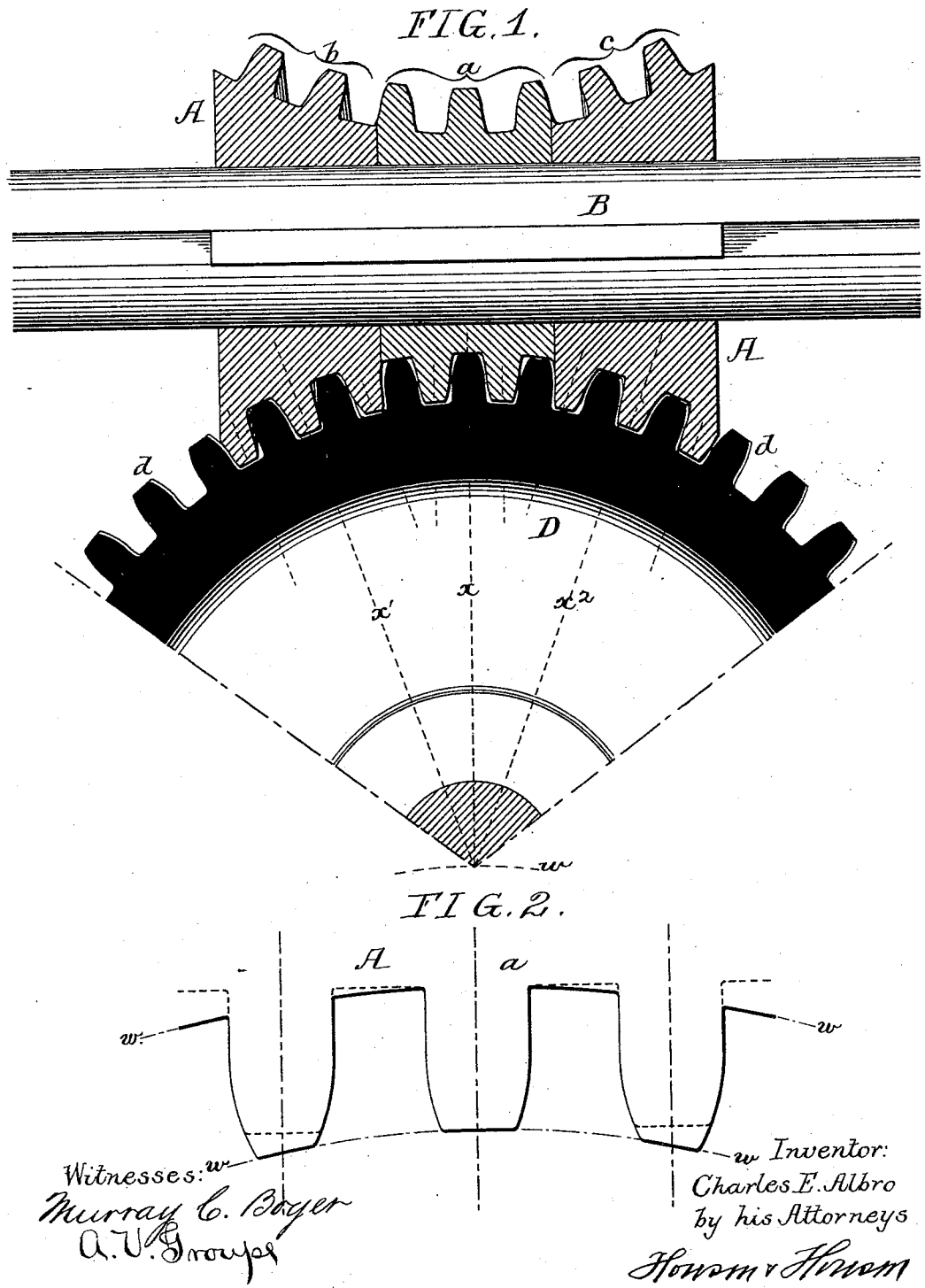

CHARLES E. ALBRO, OF PHILADELPHIA, PENNSYLVANIA.

WORM-GEAR.

SPECIFICATION forming part of Letters Patent No. 486,318, dated November 15, 1892.

Application filed October 19, 1891. Serial No. 409,155. (No model.)

*To all whom it may concern:*

Be it known that I, CHARLES E. ALBRO, a citizen of the United States, and a resident of Philadelphia, Pennsylvania, have invented certain Improvements in Worm-Gears, of which the following is a specification.

One object of my invention is to so construct a worm-gear as to increase the extent of bearing-surface between the convolutions of thread of the worm and the teeth of the worm-wheel with which it engages, another object being to provide for cutting the thread of the worm in an ordinary metal turning-lathe, so as to cheapen the manufacture.

Figure 1 in the accompanying drawings is a sectional view illustrating my improved worm-gearing, and Fig. 2 is an enlarged view of a number of teeth of the improved worm.

In worms of the ordinary construction the central convolution of the thread is the only portion of the worm that has a full bearing on the teeth of the worm-wheel. Consequently the strain comes mainly on one tooth of the wheel and said central convolution of the worm-thread. Therefore the teeth of the wheel and the thread of the worm have to be made very heavy to withstand the strain.

Worms have been made in which the periphery of the worm was of the same curve longitudinally as the periphery of the worm-wheel, all the convolutions of the worm-thread radiating from a common center at the axis of the worm-wheel; but this worm is exceedingly difficult to make and demands the employment of expensive special machinery.

The aim of my invention is to overcome this objection.

In the accompanying drawings, A represents my improved worm made in three sections $a\ b\ c$, all the sections being secured to a shaft B by a key or other fastening device, or the several sections may be made in one piece.

D is a worm-wheel having teeth $d$, with which the thread of each worm-section engages.

In forming the worm I take three lines $x$ $x'$ $x^2$, all radiating from the center of the worm-wheel, the pitch-line of the convolutions of the worm being on a curve struck from the same center. The worm is cut in sections, and in cutting the section $a$, I mount the cutting-tool parallel with the line $x$ and then guide it on the line $w$, Fig. 2, which is the same as the pitch of the convolutions, keeping the tool always parallel to the center line $x$. Consequently I shape each convolution of the section the same as if it were a convolution of a straight worm, but so direct the travel of the tool that it will follow the pitch-line of the worm-wheel with which the worm is to engage. I then transfer the tool, so that it will be parallel with the line $x'$, and cut the convolutions of the conical worm $b$ in the same manner, using the pitch-line of the worm-wheel as the guide for the pitch-line of the convolutions of said conical section, but keeping the cutting-tool parallel with the line $x'$ as it travels across the face of the conical worm, thereby shaping the convolutions as if they were on a true cone, but forming the pitch-line of the convolutions on the curve described. The section $c$ is cut in the same manner as the section $b$. It will therefore be seen that there are three good bearing-points between the thread of the worm and the teeth of the wheel, these bearing-points being at the three radial lines $x\ x'\ x^2$, and I thus obtain a much more extended bearing than is afforded by the ordinary worm-wheel. The threads of the several sections are so united as to form, practically, a continuous thread, as shown clearly in Fig. 1, and the several sections may be adjusted as required.

By my invention I am enabled to make the teeth of the worm-wheel and the threads of the worm much lighter than usual, owing to the fact that I obtain three times the bearing-surface usually obtained, and at the same time the worm is cheaply made on an ordinary lathe and can be geared to the worm-wheel the same as a worm having a straight pitch-line.

In some cases the worm may have but two sections instead of three—for instance, the two end sections or the center section and one of the end sections—and the invention may also be applied to single worms, the convolutions in this case following the pitch-line of the worm-wheel, but all of the convolutions being parallel at the point of engagement with said worm-wheel.

I claim as my invention—

1. A worm having the pitch-line of its convolutions conforming to the pitch-line of the teeth of the wheel with which it is to engage, the center lines of all of the convolutions at their points of engagement with the teeth being parallel with each other, substantially as specified.

2. A worm comprising a series of sections, each of which has the pitch-line of its convolutions conforming to the pitch-line of the teeth of the wheel with which it is to engage, the center line of each convolution of each section at the point where said convolution engages with a tooth of the worm-wheel being parallel with a radial line drawn from the axis of the worm-wheel through the center of said section, substantially as specified.

In testimony whereof I have signed my name to this specification in the presence of two subscribing witnesses.

CHARLES E. ALBRO.

Witnesses:
EUGENE ELTERICH,
HENRY HOWSON.